Oct. 27, 1931.  A. G. EGLER  1,829,638
ELECTRICALLY WELDED JARRED STEEL PIPE
Filed Jan. 13, 1931
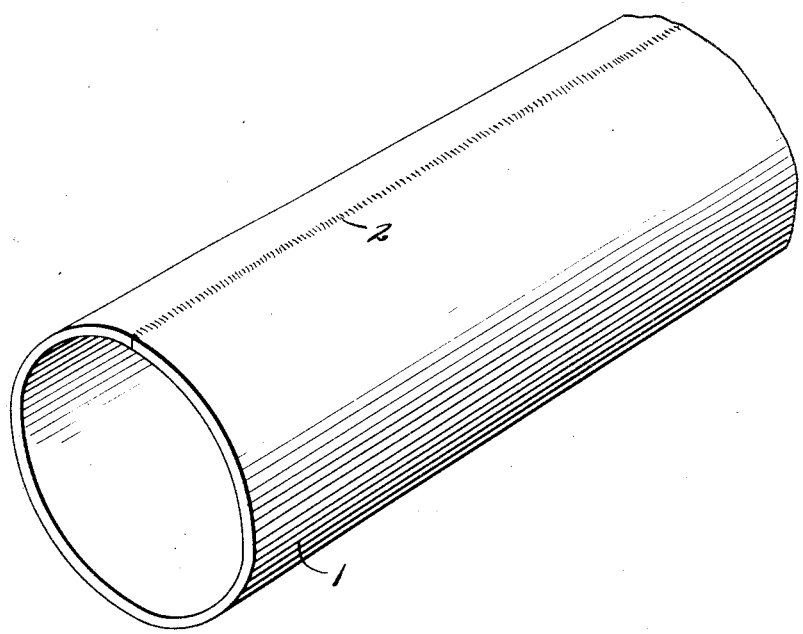

Patented Oct. 27, 1931

1,829,638

UNITED STATES PATENT OFFICE

ANDREW G. EGLER, OF YOUNGSTOWN, OHIO

ELECTRICALLY WELDED JARRED STEEL PIPE

Application filed January 13, 1931. Serial No. 508,560.

My invention relates to an electrically welded joint and has particularly in view the production of electrically welded steel pipe and the like.

Large diameter steel pipe such as from about 18–24 inches must stand a hydraulic pressure test of about 450 lbs. per square inch for 20 minutes. In order to stand this test, the steel must have a tensile strength of about 60,000 lbs. per square inch. To produce this and other desired physical properties in the steel, it is necessary to use a steel containing approximately .20 to .30 carbon and .45 to .55 manganese. Steel of this high carbon content must ordinarily be "killed" during the casting of the ingot, i. e. a deoxidizer must be added to get rid of the large amount of occluded gases contained in high carbon steels. There are disadvantages, however, in using "killed" steel in the making of pipe.

I have discovered that "jarred" steel as made by the process disclosed in my application for Patent Ser. No. 318,190, filed November 9, 1928, and in my French Patent No. 666,567 and my British Patent Nos. 303,157, 342,716, and 345,983, has surprising advantages in the making of electrically welded joints and especially for electrically welded pipe. By jarring in the manner set forth in my aforesaid application and patents, substantially all of the slag and other non-metallic inclusions will be eliminated from the steel and the steel will have increased ductility, ultimate strength and elastic limit as compared to unjarred ingot steel, of the same composition.

In the production of electrically welded pipe one of the first requisites is clean, sound steel, free from non-metallic inclusions, seams, snakes or laminations. Each defect is a characteristic cause for failure of the weld.

The drawing shows a perspective view of a section of the electrically welded pipe in which, 1 indicates the body of the pipe and 2 the welding line or seam.

In the manufacture of pipe, the steel is heated and rolled into a plate in the usual manner. Both sides of the plate are inspected for surface defects and if approved, the plate is sent to the electric weld mill, where it is placed upon a conveyor leading to the forming mill. In one way of forming the plates, the mill comprises eight stands of especially designed rolls, which form the plates into a perfect circle of the desired size. These rolls have a very fine adjustment, so that the final size of the pipe is within certain definite limits before reaching the electric welding unit. Any suitable type of welding apparatus may be used so as to provide a sufficient temperature to cause the ends of the plate which are firmly butted together to fuse into a single solid mass. The efficiency of the welding unit is seriously reduced if the plate is very heavy. The thicker the plate the higher the temperature that must be employed and contrariwise, the thinner the metal, the less the temperature needed. The best type of weld is one that can be made at the lowest temperature. The thickness of the metal plate is governed by the necessary strength required. For steel pipe, therefore, a high tensile strength of the steel is required so as to get a thin welding section. High tensile strength reverts back to the high pressure to which the pipe is to be subjected.

In order to secure the best results, a grade of steel must be had which when rolled will be sufficiently thin to secure the maximum efficiency from the forming and welding units and yet will have the necessary tensile strength and be capable of withstanding a high pressure.

For the electric welding operation, "jarred" steel has proven itself superior to non-jarred "open" and "killed" steel. In the forming operation, the best and easiest formed pipe can be produced from "jarred" steel without regard to the chemical specifications. Pipe formed from high carbon non-jarred steel is not satisfactory due to the uneven texture of the steel plate, which causes a differential in the elongation and elasticity. This manifests itself by certain portions of the plate stretching in the cold forming operation, producing an uneven side, so that when the sides are butted together to form the weld line of the pipe cavities are often left which causes an improper weld, as the weld depends on a perfect butt of the two sides, so that fusion can take place between the solid surfaces.

Non-jarred killed steel does not lend itself to the cold forming operation as readily as jarred steel. While non-jarred killed steel can be formed into the cylindrical shape, it will not retain the perfect cylindrical shape as the sides spring apart, leaving too wide a gap for the successful operation of the welding unit.

The elimination of substantially all the slag and other non-metallic inclusions from jarred steel is advantageous because a single non-metallic inclusion along the welding line would result in an imperfect weld, as the included slag would melt and prevent the fusion of metals at this particular point. Laminations of any kind along the welding line or the interior of the plate makes the plate unsuitable. Along the weld line, it prevents a proper weld and when on the interior part of the plate causes a failure in the cold forming operation.

Unless the steel is jarred, it can not be made suitable for electrically welded pipe to meet the required specifications and especially with respect to a high carbon content. The nearest approach is non-jarred killed steel. It is impossible to produce "open" steel free from blow holes, seams, segregations and non-metallic inclusions. "Killed" jarred steel can be used with the same desirable results as "open" jarred steel. Therefore, the success of the entire electric weld process is dependent upon the clean, sound steel, which can only be produced by the jarring process specified.

From the above description it will be clear that by using jarred steel, I can produce a welded joint superior to that produced from other kind of steel. By using jarred steel for pipe, I can produce a pipe having a better weld and one that can be subjected to higher pressure than unjarred steel, such pipe of the same gauge standing a test of 750 lbs. hydraulic pressure per square inch.

What I claim is:

Electrically welded steel pipe made from "jarred" steel that is substantially free from slag and other non-metallic inclusions along the welding line and in the body of the pipe.

In testimony whereof I affix my signature.

ANDREW G. EGLER.